Patented July 25, 1950

2,516,186

UNITED STATES PATENT OFFICE 2,516,186

2-NITRO-1,1-BIS (P-CHLOROPHENYL) ALKANES, AND INSECTICIDAL COMPOSITIONS CONTAINING SAME

Henry B. Hass, West Lafayette, Ind., and Robert T. Blickenstaff, Wyoming, Ohio, assignors to Purdue Research Foundation, La Fayette, Ind., a corporation of Indiana No Drawing. Application November 18, 1948, Serial No. 60,834

6 Claims. (Cl. 167—30)

Our invention relates to insecticidal compositions, and is particularly concerned with materials adapted for killing the milkweed bug and other insects. More particularly, it relates to compounds having the general formula:

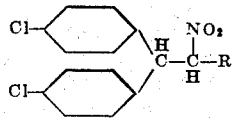

wherein R is an alkyl chain selected from the group $CH_3$ and $C_2H_5$, as active ingredients in such compositions.

Nearly all of the practical insecticides now known to the art suffer from serious disadvantages, among the most serious of which is the fact that they are highly selective in their action. This means that the choice of an insecticide must be governed by the particular insect pest against which it is to be used. Even closely related insecticides have selective insecticidal properties which differ unpredictably, or are even totally dissimilar. Moreover, certain insects are virtually immune to all known insecticides, when applied in economically feasible quantities.

Further disadvantages frequently prevent an insecticidal agent with adequate killing properties from being used commercially. The agent may, for example, produce a discoloration of, or impart a taste to the infested vegetable or animal, rendering them unsuitable for marketing. Also, the agent may be difficult to apply or dangerous both during and after application. Then, there is the factor of cost, which is a prohibitive disadvantage for many insecticidal agents. Another disadvantage directly related to that of high cost is that many agents must be applied in relatively strong concentrations. As a general rule, it may be stated that the lower the required toxic concentration, the lower the cost of using an insecticidal agent.

The efficacy of an insecticidal composition is most generally and universally measured in terms of per cent "kill." It goes without saying that such measurements must be for a definite period of time, and that other conditions must be carefully controlled and standardized to permit comparisons of results. For flying insects, the efficacy may also be measured in terms of per cent "knock-down." Many prior art insecticides possess "kill" and "knock-down" properties in differing degrees. For this reason, it may be necessary to combine two or more compounds in order to achieve effectively both "knock-down" and "kill." In general, an insecticide possessing both properties in a high degree would have greater utility, than another insecticide which was comparable in only one property.

We have now discovered that compounds having the general formula:

wherein R is an alkyl chain selected from the group $CH_3$ and $C_2H_5$ possess strong insecticidal properties; and, in particular, that these compounds are especially effective killing agents for the milkweed bug, which could not be killed by practical quantities of previously known insecticides. Also, we have discovered that our new compounds are unusually effective against flies, the Mexican bean beetle, the pea aphid, and the southern army worm. We have also discovered that not only do our compounds produce a high per cent "kill," when used in low concentrations against flies; but also that they possess excellent "knock-down" properties.

Our invention comprises two compounds; namely, 2-nitro-1,1-bis(p-chlorophenyl)propane and 2-nitro-1,1-bis(p-chlorophenyl)butane. The 2-nitro-1,1-bis(p-chlorophenyl)propane of our invention may be prepared as follows:

One thousand four hundred twenty ml. of sulfuric acid (2–3 per cent $SO_3$) was mixed with 9.35 moles (1050 g.) of chlorobenzene and cooled to 10° C. in an ice-salt bath. Three and eight-tenths moles (820 g.) of 1-p-chlorophenyl-2-nitro-1-propanol was then added dropwise to the thoroughly stirred mixture at such a rate that the temperature remained between 10 and 15° C. After the addition of the nitro alcohol, the mixture was stirred at room temperature for 10 hours, then poured over cracked ice and allowed to stand several hours.

The mixture was extracted with ether and the ether solution washed with sodium bicarbonate solution, saturated sodium bisulfite solution, and water. The ether was then evaporated and the residue steam distilled. The residue from the steam distillation was dissolved in ether, the ether solution dried with anhydrous sodium sulfate, and the ether evaporated. The residue was a viscous oil which gradually crystallized. After several recrystallizations from absolute ethanol, a white solid remained which melted at 80.5–1.5° C. The yield of 1,1-bis-p-chlorophenyl-2-nitropropane was 437 g., 37 per cent.

The 1-p-chlorophenyl-2-nitro-1-propanol used in the above condensation was obtained by condensing p-chlorobenzaldehyde with nitroethane. A convenient method of effecting this condensation is as follows:

Four moles (562 g.) of p-chlorobenzaldehyde was added with stirring to a solution of 440 g. of sodium bisulfite in 2000 ml. of distilled water and stirred at room temperature for 2 hours. Simultaneously, 4.4 moles (330 g.) of nitroethane was dissolved slowly in a solution of 180 g. of sodium hydroxide in 800 ml. of water, which was cooled in an ice-salt bath.

These solutions were mixed and stirred at room temperature for 12 hours, then poured into a separatory funnel. The two layers were separated, the aqueous layer was extracted with ether, and the ether portion was added to the organic layer. The ether solution was extracted with saturated sodium bisulfite solution until the unreacted aldehyde was removed. The ether solution was then dried with anhydrous sodium sulfate and the ether evaporated. The conversion to 1-p-chlorophenyl-2-nitro-1-propanol was 820 g., 95 per cent.

The 2-nitro-1,1-bis(p-chlorophenyl)butane may be prepared by condensing 1-p-chlorophenyl-2-nitro-1-butanol with chlorobenzene, following the same procedure as that given above for condensing 1-p-chlorophenyl-2-nitro-1-propanol with chlorobenzene. Also, the 1-p-chlorophenyl-2-nitro-1-butanol may be prepared by a condensation of p-chlorobenzaldehyde with 1-nitropropane, substantially as described above for the preparation of 1-p-chlorophenyl-2-nitro-1-propanol.

The compounds of our invention are not uniformly toxic to different insects, although they both have approximately equal toxicity for the same kind of insects. Thus, the lowest quantity of our compounds which can be used effectively in insecticidal compositions depends primarily on the particular insect to be combated. The required concentration also depends to some extent on such factors as the carrier used, method of application, and location of insects. In general, however, compositions containing about 2 per cent by weight, in either a liquid or solid carrier, give excellent results. For some requirements, stronger concentrations may be desirable. Five per cent concentrations of our compounds in a liquid carrier give a virtually complete "knock-down" of flies in five minutes. A 1.0 per cent concentration of 2-nitro-1,1-bis(p-chlorophenyl)propane gave a 100% "knock-down" of flies in ten minutes. The "knock-down" property of our compounds is comparable with that of "lethane," which is a commonly used "knock-down" agent in insecticides. Also, five per cent concentrations in a dust have been found particularly effective in killing the milkweed bug, an insect which is particularly difficult to kill, and has a virtually complete immunity to many other insecticides. For many common insect pests, concentrations much lower than 2 per cent can be used. Tables I and II show that quite low concentrations of 2-nitro-1,1-bis(p-chlorophenyl)propane and 2-nitro-1,1-bis(p-chlorophenyl)butane continued to give a high per cent "kill."

Each entry in Tables I and II below is an average of several replications. The testing procedure used for female houseflies was substantially as follows:

Solutions of various concentrations were prepared by dissolving the active agents in a solvent as a carrier. Adult flies reared in the laboratory under constant conditions were introduced into replicated spherical cages. Each cage was then placed on a revolving turntable, and the flies subjected to an atomized spray under constant pressure until 1.0 ml. was delivered per cage. Immediately after the flies in a cage were sprayed, they were transferred to an observation cage, in which they were maintained under constant conditions for twenty-four hours. At the end of that time the number of dead flies was counted.

For the Mexican bean beetle, the pea aphid, and the southern army worm the following procedure was used: Different quantities of the active insecticidal agent were uniformly mixed with a solid inert carrier in the form of a finely ground powder. The dust thus obtained was applied in 0.2 gram amounts to host plants to which the insects were then transferred. The host plants utilized for the Mexican bean beetle and the southern army worm were cranberry beans, while broad Windsor beans were used for the pea aphid. At the end of forty-eight hours for the southern army worm, and seventy-two hours for the Mexican bean beetle and the pea aphid, the percentage of dead insects was determined.

In the case of the milkweed bug, 0.4 gram of the dust carrying the insecticidal agent was blown directly onto the insects and the latter then transferred to clean cages into which milkweed seeds had been introduced as food. After seventy-two hours, the percentage of dead insects was determined.

TABLE I 2-nitro-1,1-bis(p-chlorophenyl) propane

| Insect | Per Cent Concentration of Toxicant | Average Per Cent Kill |
|---|---|---|
| Flies | 0.25 | 80 |
| Do | 0.50 | 100 |
| Mexican Bean Beetle | 0.062 | 67 |
| Do | 0.125 | 85 |
| Do | 0.25 | 100 |
| Pea Aphid | 1.25 | 95 |
| Do | 2.50 | 100 |
| Southern Army worm | 0.125 | 80 |
| Do | 0.25 | 100 |
| Milkweed Bug | 5.00 | 95 |

TABLE II 2-nitro-1,1-bis(p-chlorophenyl) butane

| Insect | Per Cent Concentration of Toxicant | Average Per Cent Kill |
|---|---|---|
| Flies | 0.25 | 70.3 |
| Mexican Bean Beetle | 0.062 | 89 |
| Do | 0.125 | 93 |
| Do | 0.25 | 100 |
| Pea Aphid | 0.25 | 69 |
| Do | 0.5 | 85 |
| Do | 1.25 | 100 |
| Southern Army worm | 0.5 | 79 |
| Milkweed Bug | 5.00 | 46 |

The inert diluents used in insecticidal compositions, whether liquid or solid, are generally called carriers or vehicles. For our compounds, many different carriers may be used. Effective concentrations can be obtained with most common solvents for relatively long-chain nitroparaffin hydrocarbons. The upper limit of the possible concentration in these solvents, however, will be below five per cent in many cases, because our compounds are relatively insoluble.

Household spray kerosene (ultrasene) was used as the carrier in the fly tests reported above. Effective concentrations can be produced in other liquid carriers such as the lower aliphatic alcohols (methyl, ethyl, propyl, butyl), chlorinated hydrocarbon solvents (carbon tetrachloride, dichloromethane, trichloroethane) and aromatic hydrocarbons (benzene, xylene, toluene). Aqueus suspensions of about one per cent can be made and are unusually effective in some cases. For example, a 0.5% aqueous suspension of 2-nitro-1,1-bis(p-chlorophenyl)propane gave a 97% "kill" of the pea aphid in 72 hours. Also, aqueous emulsions may be advantageously used.

As a solid vehicle we may employ any of the forms of powdered aluminum silicate which are commonly employed in insecticidal compositions, such as pyrophyllite, bentonite, fuller's earth, kieselguhr, kaolin, and talc. In the tests reported above, except for flies, prophyllite was employed as the carrier. When solid carriers are used, there is, of course, no limit to the obtainable concentrations.

In addition to either a liquid or solid carrier, other killing agents may be combined with our compounds. Low solubilities might limit the use of certain additional agents in a liquid carrier; but, in general, our compounds may be used in conjunction with killing agents such as pyrethrum, rotenone, derris extract, nicotine, and organic thiocyanates.

Economically, our compounds possess the great advantage of remaining highly toxic in very low concentrations. Another advantage of our compounds, not mentioned elsewhere is that they do not produce a discoloration of vegetables such as squash and cucumber. Furthermore, our compounds are especially safe; and, when it comes to performance combined with safety, our compounds are a great improvement over similar prior art insecticides.

Now having described our invention, what we claim is:

1. The compounds of the general formula:

wherein R is an alkyl chain selected from the group $CH_3$ and $C_2H_5$.

2. 2-nitro-1,1-bis(p-chlorophenyl)propane.
3. 2-nitro-1,1-bis(p-chlorophenyl)butane.
4. An insecticidal composition comprising from about .062 to about 5.0% of a compound of the general formula:

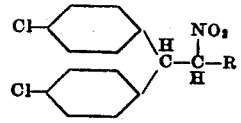

wherein R is an alkyl chain selected from the group $CH_3$ and $C_2H_5$, and a carrier therefor.

5. The composition of claim 4 where the carrier is a petroleum distillate.
6. The composition of claim 4 where the carrier is a powdered aluminum silicate.

HENRY B. HASS.
ROBERT T. BLICKENSTAFF.

REFERENCES CITED

The following references are of record in the file of this patent:

UNITED STATES PATENTS

| Number | Name | Date |
| --- | --- | --- |
| 2,397,802 | Muller | Apr. 2, 1946 |

---

Certificate of Correction

Patent No. 2,516,186                              July 25, 1950

HENRY B. HASS ET AL.

It is hereby certified that error appears in the printed specification of the above numbered patent requiring correction as follows:

Column 5, line 20, for "prophyllite" read *pyrophyllite*;

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*